US012683194B2

(12) United States Patent
Mai et al.

(10) Patent No.: US 12,683,194 B2
(45) Date of Patent: Jul. 14, 2026

(54) ELECTROLYTE FOR LI SECONDARY BATTERIES

(71) Applicant: UMICORE, Brussels (BE)

(72) Inventors: Sebastian Mai, Ilmenau (DE); Svetlozar-Dimitrov Ivanov, Ilmenau (DE); Andreas Bund, Ilmenau (DE)

(73) Assignee: UMICORE, Brussels (BE)

( * ) Notice: Subject to any disclaimer, the term of this patent is extended or adjusted under 35 U.S.C. 154(b) by 680 days.

(21) Appl. No.: 17/785,459

(22) PCT Filed: Dec. 21, 2020

(86) PCT No.: PCT/EP2020/087384
§ 371 (c)(1),
(2) Date: Jun. 15, 2022

(87) PCT Pub. No.: WO2021/123408
PCT Pub. Date: Jun. 24, 2021

(65) Prior Publication Data
US 2023/0019330 A1     Jan. 19, 2023

Related U.S. Application Data

(60) Provisional application No. 62/951,036, filed on Dec. 20, 2019.

(30) Foreign Application Priority Data

Dec. 20, 2019     (EP) .................................... 19218679

(51) Int. Cl.
H01M 10/0569     (2010.01)
H01M 10/0525     (2010.01)
(Continued)

(52) U.S. Cl.
CPC ... H01M 10/0569 (2013.01); H01M 10/0525 (2013.01); H01M 10/0567 (2013.01);
(Continued)

(58) Field of Classification Search
CPC .......................... H01M 10/0566–0569; H01M 2300/0028–0042
See application file for complete search history.

(56) References Cited

U.S. PATENT DOCUMENTS

2016/0226101 A1     8/2016  Teran et al.
2019/0140322 A1     5/2019  Ren et al.

FOREIGN PATENT DOCUMENTS

JP          2012018801 A       1/2012
JP          2017228513 A      12/2017
(Continued)

OTHER PUBLICATIONS

ISA/EP; International Search Report and Written Opinion for International Patent Application No. PCT/EP2020/087384 dated Apr. 8, 2021, 11 pages.
(Continued)

*Primary Examiner* — Robert S Carrico
(74) *Attorney, Agent, or Firm* — Rimon P.C.; Allyn B. Elliott

(57)          ABSTRACT

The present invention relates to a sulfolane-based electrolyte composition suitable for Lithium secondary batteries, comprising lithium bis(trifluoromethansolfonyl)imide (LiTFSI) in an amount (x) of 39.0 vol %≤x≤47.5 vol %, fluoroethylene carbonate (FEC) in an amount (y) of 0<y≤15 vol %, equivalent to an amount of 0<y≤14.0 wt. %, relative to the total volume, respectively weight, of the electrolyte composition, and sulfolane, wherein SL/LiTFSI is comprised in a molar ratio (z) of 2≤z≤3.5 as well as its application in a Lithium secondary battery cell.

7 Claims, 3 Drawing Sheets

(51) Int. Cl.
   H01M 10/0567          (2010.01)
   H01M 10/0568          (2010.01)
(52) U.S. Cl.
   CPC .................. H01M 10/0568 (2013.01); **H01M
      2300/0034 (2013.01); H01M 2300/0037**
                                         (2013.01)

(56)                 References Cited

FOREIGN PATENT DOCUMENTS

| | | | |
|---|---|---|---|
| KR | 20140125970 A | 10/2014 | |
| WO | 2012029551 A1 | 3/2012 | |
| WO | WO-2016204278 A1 * | 12/2016 | ............ H01M 10/05 |
| WO | WO-2018044952 A1 * | 3/2018 | .......... H01M 10/052 |

OTHER PUBLICATIONS

WIPO; International Preliminary Report on Patentability for International Patent Application No. PCT/EP2020/087384 dated Feb. 25, 2022, 24 pages.

Kannan, Dhevathi Rajan Rajagopalan, et al., "Analysis of the Separator Thickness and Porosity on the Performance of Lithium-Ion Batteries", International Journal of Electrochemistry, Jul. 8, 2018, vol. 2018, 8 pages, accessed at: https://doi.org/10.1155/2018/1925708.

Wang, Fang, et al., "A dual pore carbon aerogel based air cathode for a highly rechargeable lithium-air battery", Journal of Power Sources, Elsevier, vol. 272, Sep. 11, 2014, 12 pages.

Tong, Bo, Ph.D., "Improving Stability of Lithium Metal Anodes through Electrolyte Engineering for Rechargeable Lithium Metal Batteries", Doctoral Dissertation, Physics and Chemistry of Materials, Huazhong University of Science & Technology, May 2019, 16 Pages.

USPTO: Non-final Office Action in U.S. Appl. No. 17/785,476, mailed Feb. 27, 2025, 38 pages.

Korean Patent Office: Office Action in Korean Patent Application No. 10-2022-7025139, mailed Nov. 18, 2024, 6 pages.

Korean Patent Office: Office Action in Korean Patent Application No. 10-2022-7025139, mailed Nov. 18, 2024, English Translation, 6 pages.

USPTO: Final Office Action in U.S. Appl. No. 17/785,476, mailed Jul. 15, 2025, 25 pages.

* cited by examiner

ELECTROLYTE FOR LI SECONDARY BATTERIES

CROSS-REFERENCE TO RELATED APPLICATIONS

This application is a U.S. National Stage application of International Patent Application No. PCT/EP2020/087384, filed on Dec. 21, 2020, which claims the benefit of European Patent Application No. 19218679.9, filed on Dec. 20, 2019, and the benefit of U.S. Provisional Patent Application No. 62/951,036, filed on Dec. 20, 2019.

TECHNICAL FIELD

The present invention relates to an electrolyte composition for Li metal-based or lithium-ion batteries. In particular, the present invention relates to an electrolyte composition suitable for lithium secondary batteries, comprising lithium bis(trifluoromethansolfonyl)imide (LiTFSI) in an amount (x) of 39.0 vol %≤x≤47.5 vol %, fluoroethylene carbonate (FEC) in an amount (y) of 1.0≤y≤15.0 vol %, equivalent to an amount of 1.0≤y≤14.0 wt. %, relative to the total volume, respectively weight, of the electrolyte composition, and the remaining volume of the electrolyte is comprised of a suitable solvent such as sulfolane (SL), wherein SL/LiTFSI is comprised in a molar ratio (z) of 2.0≤z≤3.5 as well as its application in a lithium secondary battery cell.

BACKGROUND

The three primary functional components of a lithium-ion battery are the anode, the cathode, and the electrolyte. The anode of a conventional lithium-ion cell is made from carbon, the cathode of transition metal oxides such as cobalt, nickel, manganese, and the electrolyte is a non-aqueous solvent containing a lithium salt. Other lithium-ion batteries, e.g. based on lithium iron phosphates cathodes, are also present on the market.

The electrolyte should conduct lithium ions, acting as a carrier between the cathode and the anode when a battery passes an electric current through an external circuit. Electrolyte solvents in current use decompose on initial charging and form a solid interphase layer, which is electrically insulating, yet provides sufficient ionic conductivity. This interphase prevents further decomposition of the electrolyte in subsequent charge/discharge cycles.

Such electrolyte solvents typically consist of a mixture of organic carbonates such as ethylene carbonate (EC), di-methyl carbonate (DMC) and propylene carbonate (PC) and the lithium salt normally consists of a hexafluorophosphate, LiPF6. WO 2016/204278 A1 discloses a nonaqueous electrolyte composition comprising various lithium salts and sulfolane.

As the market of lithium secondary batteries is rapidly expanding and there is an increasing demand for smaller and lighter batteries, which are suitable for portable electronic devices and which show tremendous energy densities, led to intensive developments attempting to achieve safe and stable batteries with higher capacities and which are able to operate at high operating voltages. The capacity of a battery for portable electronic devices has currently reached a plateau mainly due to electrolyte stability limiting the operating voltage. The operating voltage of commercial batteries suitable for portable electronic devices currently varies from 4.2V to maximum 4.4V. For very high-end portable electronic devices such as leading-edge mobile phones, batteries applying operating voltages of at least 4.4V (and preferably not more than 4.5V) are requested. Moreover, some electrolyte compositions for secondary Lithium ion battery cells have safety issues, i.e. being inflammable.

It is therefore an object of the present invention to provide a stable, safe, and high energy density battery exhibiting good cycle life (which can be for instance sufficient to high or excellent cycle life) enabled through a high coulombic efficiency (i.e. of at least 93%, preferably of at least 98%), preferably at a higher voltage range i.e. at a voltage higher than 4.4V) versus conventional cut-off or operating voltages (limited to 4.4 V).

This object has been solved by using a sulfolane (SL)-based electrolyte composition suitable for lithium secondary batteries, comprising lithium bis(trifluoromethansolfonyl) imide (LiTFSI) in an amount (x) of 39.0 vol %≤x≤47.5 vol % and fluoroethylene carbonate (FEC) in an amount (y) of 1.0≤y≤15.0 vol %, equivalent to an amount of 1.0≤y≤14.0 wt. %, relative to the total volume, respectively weight, of the electrolyte composition, and the remaining volume of the electrolyte is comprised of a suitable solvent such as sulfolane (SL), wherein SL/LiTFSI is comprised in a molar ratio (z) of 2.0≤z≤3.5, wherein vol % is defined as the volume of a specific constituent divided by the total volume of LiTFSI (M: 287.08 g/mol, ρ: 1.33 g/cm³), FEC (M: 106.05 g/mol, ρ: 1.45 g/cm³), and SL (M: 120.17 g/mol, ρ: 1.26 g/cm³).

DETAILED DESCRIPTION OF THE INVENTION

Figure 1:
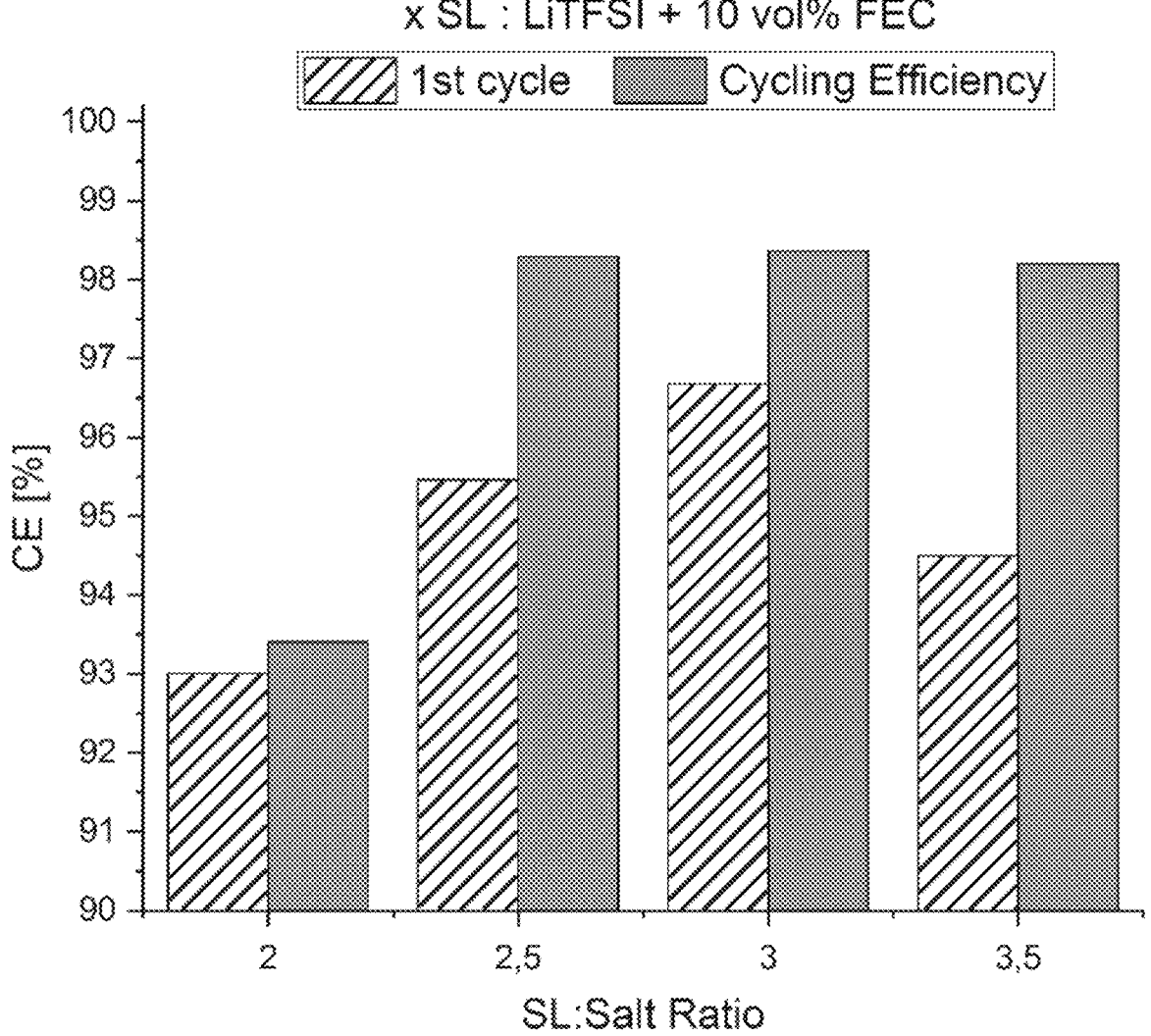
FIG. 1: Experimental results on the relationship between cycling efficiency and varying molar ratios between sulfolane (SL) and lithium bis(trifluoromethansolfonyl)imide (LiTFSI) at fixed 10.0 vol % fluoroethylene carbonate (FEC) content.

The present invention relates to a sulfolane (SL)-based composition suitable for lithium secondary batteries, comprising lithium bis(trifluoromethansolfonyl)imide (LiTFSI) in an amount (x) of 39.0 vol %≤x≤47.5 vol %, fluoroethylene carbonate (FEC) in an amount (y) of 1.0≤y≤15.0 vol %, equivalent to an amount of 1.0≤y≤14.0 wt. %, relative to the total volume, respectively weight, of the electrolyte composition, and sulfolane (SL), wherein SL/LiTFSI is comprised in a molar ratio (z) of 2.0≤z≤3.5.

For the sake of clarity, a skilled person is able to calculate the vol % or volume percentage and the wt. % or weight percentage of each for the herein-described ingredients and molar ratios between each of the herein-described ingredients from the physical data available for each of the herein-described ingredients.

For the sake of clarity, the vol % or volume percentage and the wt. % or weight percentage is herein based on the total volume of the electrolyte composition unless stated otherwise.

According to the present invention, the electrolyte composition comprises lithium bis(trifluoromethansolfonyl)imide (LiTFSI) in an amount (x) of 39.0 vol %≤x≤47.5 vol %, equivalent to an amount of 37.9 wt. %≤x'≤48.9 wt. % relative to the total volume, respectively weight, of the electrolyte composition. LiTFSI is a well-known chemical compound (CAS: 90076-65-6). More preferably, the electrolyte composition comprises lithium bis(trifluoromethansolfonyl)imide (LiTFSI) in an amount (x) of 39.2 vol %≤x≤47.5 vol %, equivalent to an amount of 38.1 wt. %≤x'≤48.9 wt. % relative to the total volume, respectively weight, of the electrolyte composition According to the present invention, the electrolyte composition further comprises fluoroethylene carbonate (FEC) in an amount (y) of 1.0≤y≤15.0 vol %, equivalent to an amount of 1.0≤y'≤14.0 wt. %, relative to the total volume, respectively weight, of the electrolyte composition. FEC is a well-known chemical compound (CAS: 114435-02-8).

In an embodiment, FEC may be present in amounts (y) of 1.0 vol. %≤y, 1.0 vol %<y, 2.0 vol. %≤y, 2.0 vol %<y, 2.5 vol. %≤y, 2.5 vol %, 5.0 vol %≤y, 5.0 vol %≤y or 10.0 vol %≤y, relative to the total volume of the composition. Depending on the respective amounts of SL and LiTFSI in the composition, said electrolyte composition corresponds to an electrolyte composition comprising fluoroethylene carbonate (FEC) in an amount (y') of 1.0 wt. %≤y', 1.0 wt. %<y', 2.1 wt. %≤y', 2.1 wt. %<y', 2.6 wt. %≤y', 2.6 wt. %<y', 5.2 wt. %≤y', 5.2 wt. %<y' or 9.8 wt. %≤y', relative to the total weight of the composition.

In an embodiment, FEC may be present in amounts (y) of y≤15.0 vol % or y<15.0. Depending on the respective amounts of SL and LiTFSI in the composition, said electrolyte composition corresponds to an electrolyte composition comprising fluoroethylene carbonate (FEC) in an amount (y') of about 14.0 wt. %≤y' or 14.0 wt. %<y', relative to the total weight of the composition.

In a preferred embodiment, FEC may be comprised in an amount (y) of 10.0≤y≤15.0 vol %, equivalent to an amount of 9.8≤y'≤14.0 wt. %, relative to the total volume, respectively weight, of the electrolyte composition.

In a more preferred embodiment, FEC may be comprised in an amount (y) of 10.0 vol %, equivalent to an amount (y') of 9.8 wt. %, relative to the total volume, respectively weight, of the electrolyte composition.

According to the present invention, the electrolyte composition further comprises sulfolane (SL). SL is a well-known chemical compound (CAS: 126-33-0).

According to the present invention, the electrolyte composition comprises SL/LiTFSI in a molar ratio (z) of 2.0≤z≤3.5.

In an embodiment, the electrolyte composition comprises SL/LiTFSI in a minimum molar ratio (z) of 2.0<z or 2.5≤z.

In an embodiment, the electrolyte composition comprises SL/LiTFSI in a maximum molar ratio (z) of z≤3.5

In a preferred embodiment, SL/LiTFSI may be comprised in a maximum molar ratio (z) of 2.0<z≤3.5.

In a more preferred embodiment, SL/LiTFSI may be comprised in a molar ratio (z) of 2.5≤z≤3.5.

In an even more preferred embodiment, SL/LiTFSI may be comprised in a molar ratio (z) of 2.5<z<3.5.

In an even more preferred embodiment, SL/LiTFSI may be comprised in a molar ratio (z) of 2.5<z≤3.0.

In an even more preferred embodiment, SL/LiTFSI may be comprised in a molar ratio (z) of 3.

In a particularly preferred embodiment, the electrolyte composition may comprise fluoroethylene carbonate (FEC) in an amount (y) of 10.0≤y≤15.0 vol %, equivalent to an amount of 0≤y'≤14.0 wt. %, relative to the total volume, respectively weight, of the electrolyte composition and SL/LiTFSI, in a molar ratio (z) of 2.5≤z≤3.5.

In a particularly preferred embodiment, the electrolyte composition may comprise fluoroethylene carbonate (FEC) in an amount of 10.0 vol %, equivalent to an amount (y') of 9.8 wt. %, relative to the total volume, respectively weight, of the electrolyte composition, and SL/LiTFSI in a molar ratio (z) of 2.5≤z≤3.5.

In a particularly preferred embodiment, the electrolyte composition may comprise fluoroethylene carbonate (FEC) in an amount of 10.0 vol %, equivalent to an amount (y') of 9.8 wt. %, relative to the total volume, respectively weight, of the electrolyte composition, and SL/LiTFSI in a molar ratio (z) of 2.5<z≤3.0.

In a particularly preferred embodiment, the electrolyte composition may comprise fluoroethylene carbonate (FEC) in an amount of 10.0 vol %, equivalent to an amount (y') of 9.8 wt. %, relative to the total volume, respectively weight, of the electrolyte composition, and SL/LiTFSI in a molar ratio (z) of 3.0.

The way of preparing the electrolyte composition is not particularly limited, i.e. it can be for example prepared by mixing the ingredients.

The present invention also relates to a Lithium secondary battery cell comprising the electrolyte composition according to the invention.

For the sake of clarity, the lithium secondary battery cell comprises at least an anode, a cathode and an electrolyte, and optionally a separator.

The electrolyte relates to the electrolyte according to the present invention described herein above.

The material of the cathode is not particularly limited, and examples thereof include a transition metal compound having a structure capable of diffusing lithium ions, or a specialized metal compound thereof and an oxide of lithium. Specifically, $LiCoO_2$, $LiNiO_2$, $LiMn_2O_4$, $LiFePO_4$, etc. can be mentioned.

The cathode can be formed by press-molding the cathode material listed above together with a known conductive auxiliary agent or binder, or the positive electrode active material together with a known conductive auxiliary agent or binder into an organic solvent such as pyrrolidone. It can be obtained by applying a mixture and pasting it to a current collector such as an aluminum foil, followed by drying.

In a preferred embodiment, the cathode is a copper foil (cathode) vs lithium foil (anode).

The material of the anode is not particularly limited as long as it is a material capable of inserting and extracting lithium. For example, lithium metal, Sn—Cu, Sn—Co, Sn—Fe or Sn—An alloy such as —Ni, a metal oxide such as $Li_4Ti_5O_{12}$ or $Li_5Fe_2O_3$, a natural graphite, an artificial graphite, a boronized graphite, a mesocarbon microbead, a carbon material such as a pitch-based carbon fiber graphitized material, carbon-Si composite or a carbon nanotube.

A separator is usually interposed between the cathode and the anode in order to prevent a short circuit between the cathode and the anode. The material and shape of the separator is not particularly limited, but it is preferable that the electrolyte composition can easily pass therethrough and that the separator is an insulator and a chemically stable material. Examples thereof include microporous films and sheets made of various polymer materials. Specific examples of the polymer material include polyolefin polymers, nitrocellulose, polyacrylonitrile, polyvinylidene fluoride, polyethylene, and polypropylene. From the viewpoints of electrochemical stability and chemical stability, polyolefin polymers are preferred.

In a preferred embodiment, the separator is a Polypropylene separator with a thickness of 40.0 μm and porosity of 48% (e.g. Cellguard 2075-1500M). Such a separator is described in the following article: International Journal of Electrochemistry, Volume 2018, Article ID 1925708, 7 pages, https://doi.org/10.1155/2018/1925708.

The optimum working voltage of the lithium secondary battery of the present invention is not particularly limited by the combination of the positive electrode and the negative electrode, but can be used at an average discharge voltage of 2.4 to 4.5V. Preferably, the lithium secondary battery cell has a high operating voltage, i.e. an operating voltage superior or equal to 4.4V and preferably inferior or equal to 4.5V.

EXAMPLES

1. Description of Coin Cell Preparations

Tested cells where coin cell types CR2025. The cells where prepared by stacking positive casing, positive electrode (pre-soaked in electrolyte), cellguard-separator, 50 μL electrolyte droplet, negative electrode, spacer, wave-type spring and negative casing on top of each other in that order. Crimping was done with a manual crimping press from MTI corp. at 80 kg/cm$^2$ pressure.

The electrolyte composition is obtained by adding fluoroethylene carbonate (FEC) in an amount (y) according to the invention with respect to the total volume of the electrolyte, to sulfolane (SL) and lithium bis(trifluoromethansolfonyl)imide (LiTFSI) in a SL/LiTFSI molar ratio (z) of 3.0 to 1.0.

2. Passivation Protocol

The passivation of the lithium samples was done by two steps. First, the cell described in the Section 1 above was constructed such that the cell was symmetric (Li metal is selected for both the anode and the cathode). Second, the cell was cycled 5 times with a current density of 0.60 mA/cm$^2$ for 2 hours per half cycle, resulting in a capacity of 1.20 mAh/cm$^2$. Afterwards the cells rested for 12 hours before being taken apart and the passivated Li electrodes comprising the SEI are extracted from the lithium cell.

3. Description of Methods for Measuring the Coulombic Efficiency

The coin cell including a passivated lithium electrode is charged and discharged several times under the following conditions to determine their charge-discharge cycle performances: the coulombic efficiency is measured with a Biologic VMP-3 potentiostat using a cell configuration consisting of a copper foil as cathode and a lithium foil as anode. Initially a certain amount of lithium metal (about 1 mg/50 μL of electrolyte corresponding to a capacity of 3.80 mAh) is plated on the copper foil using a constant current of 0.38 mA/cm$^2$ and subsequently completely removed by applying the inverse current up to the potential of 0.50 V, giving $Q_{clean}$ which is used to calculate $1^{st}$ cycle efficiency in FIGS. 1 & 2 through $CE_{1st}=Q_{clean}/Q_{initial}$.

Subsequently another approximately 1 mg/50 μL of electrolyte of lithium metal corresponding to a capacity of 3.80 mAh ($2^{nd}$ $Q_{initial}$) is plated on the copper foil using the same current density.

After this, 50 cycles (n) with the current density of 0.380 mA/cm$^2$ and each cycle cycling 12.5% of the total (3.80 mAh, $Q_{initial}$) capacity (0.475 mAh in our setup) where performed.

After the completion of the 50th cycle, the remaining lithium was stripped away from the copper electrode by applying a current density of 0.380 mA/cm$^2$ to the cut-off voltage of 0.5 V (giving $Q_{final}$).

Figure 3:
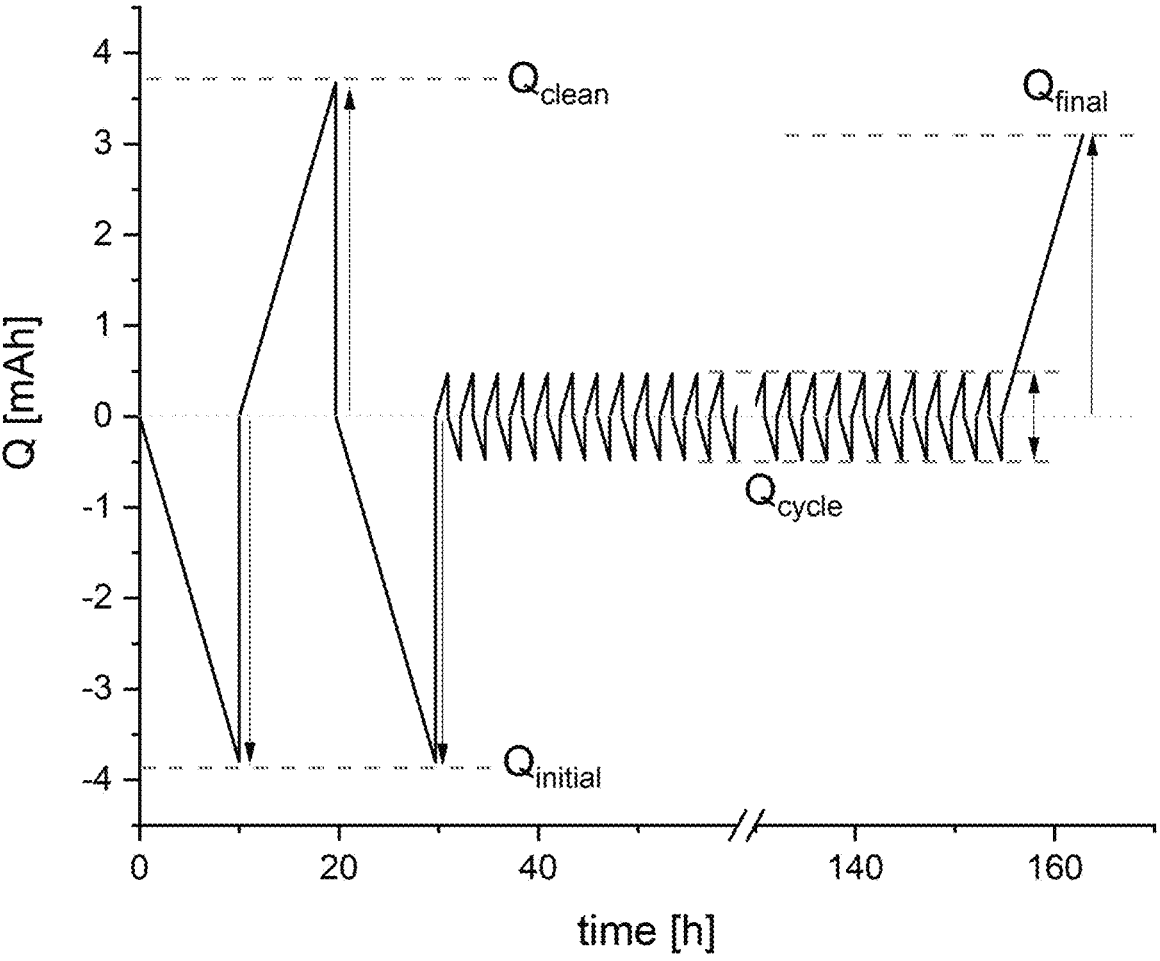
FIG. 3: Voltage profile of the procedure described in Section 3 of the Examples.

FIG. 3 shows a typical voltage profile of the procedure described above.

The CE was calculated using following general formula:

$$CE = \frac{n \cdot Q_{cycle} + Q_{final}}{n \cdot Q_{cycle} + Q_{initial}}$$

Based on the $Q_{cycle}$, $Q_{initial}$, and n are known (see the description of experiment above) the formula can be simplified to:

$$CE = \frac{23.75 \text{ mAh} + Q_{final}}{27.55 \text{ mAh}}$$

4. Experimental Tests and Results

For testing the relationship of the cycling efficiency to the molar ratio of sulfolane (SL) to lithium bis(trifluoromethansolfonyl)imide (LiTFSI), the molar ratio was varied from 2:1 to 4:1 in steps of 0.5 while keeping 10 vol % FEC content constant and the coulombic efficiency was measured in the first charge and discharge cycle and in subsequent charge and discharge cycles. The experimental results are shown in FIG. 1.

FIG. 1 shows that the cycling efficiency of the electrolyte composition depends on the molar ratio of SL/LiTFSI.

The cycling efficiency of the electrolyte according to the invention having a molar ratio of SL/LiTFS from 2:1 to 4:1 shows a significant high cycling efficiency of over 90%.

The cycling efficiency of the electrolyte composition according to the invention having a molar ratio of SL/LiTFSI between 2.5 to 3.5 are optimum with a maximum at a molar ratio of SL/LiTFSI of 3.

The cycling efficiency of the electrolyte composition having a molar ratio of more than 4:1 did significantly decrease to a degree where it was unable to cycle.

For testing the dependency of the cycling efficiency to the amount of fluoroethylene carbonate (FEC), the amount of FEC (based on the volume percentage to the total volume of the electrolyte composition) was varied from 0 to 15 vol % in steps of 2.5 vol % while keeping the molar ratio of SL:TFSI constant at 3:1 and the coulombic efficiency was measured electrolyte in the first charge and discharge cycle and in subsequent charge and discharge cycles. The experimental results are shown in FIG. 2.

Figure 2:
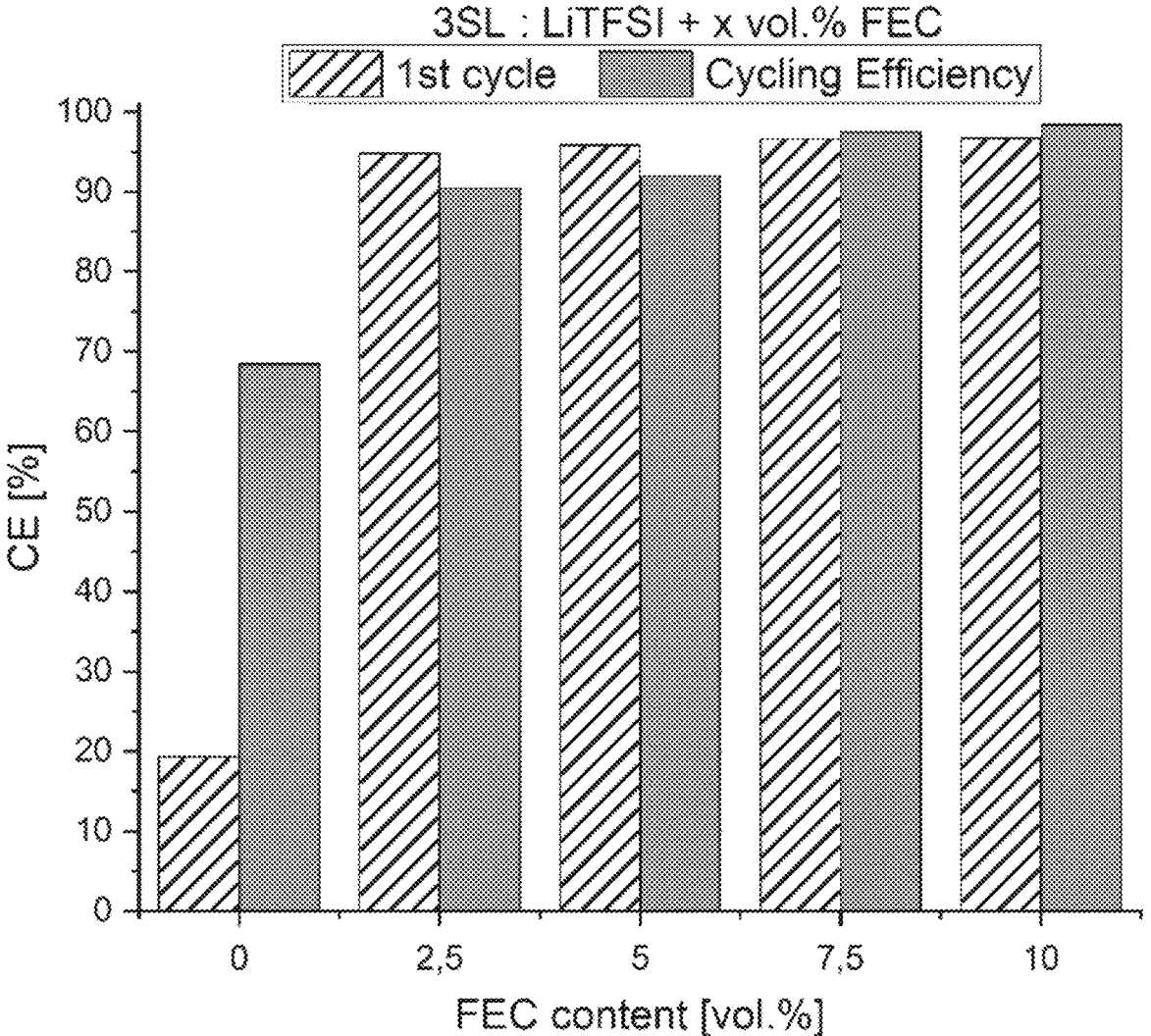
FIG. 2: Experimental results on the relationship between cycling efficiency and varying the vol % fluoroethylene carbonate (FEC) at a fixed molar ratio between sulfolane (SL) and lithium bis(trifluoromethansolfonyl)imide (LiTFSI) of 3.0 to 1.0.

FIG. 2 shows that the cycling efficiency of the electrolyte composition depends on the amount of FEC added.

The cycling efficiency of the electrolyte according to the invention having a molar ratio of shows a significant high cycling efficiency of over 90%.

The cycling efficiency of the electrolyte composition according to the invention having 10 vol %, 12.5 vol % and 15 vol % FEC has an optimum (the experimental results for 12.5 vol % and 15 vol % FEC are identical to 10 vol % FEC and, thus, have been omitted for the sake of readability). The cycling efficiency of the electrolyte composition having more than 15 vol % FEC significantly dropped and lead to unstable lithium plating behavior and cell failure.

The results depicted in FIGS. 1 and 2 are summarized in tables 1 and 2 below:

TABLE 1

| SL/LiTFSI | 1st cycle CE (%) | CE (%) |
|---|---|---|
| 2.0 | 93.00 | 93.40 |
| 2.5 | 95.46 | 98.30 |
| 3.0 | 96.68 | 98.37 |
| 3.5 | 94.50 | 98.20 |

TABLE 2

| FEC vol % | $1^{st}$ cycle CE (%) | CE (%) |
|---|---|---|
| 0.0 | 19.28 | 68.44 |
| 2.5 | 94.78 | 90.46 |
| 5.0 | 95.87 | 91.97 |
| 7.5 | 96.68 | 97.46 |
| 10.0 | 96.88 | 98.37 |

The invention claimed is:

1. A sulfolane (SL)-based electrolyte composition suitable for lithium secondary batteries, comprising:

lithium bis(trifluoromethansolfonyl)imide (LiTFSI) in an amount (x) of 37.9 wt. %≤x≤48.9 wt. %, and fluoroethylene carbonate (FEC) in an amount (y) of 5.2≤y≤14.0 wt. %, wherein SL/LiTFSI is comprised in a molar ratio (z) of 2.5≤z≤3.5.

2. The electrolyte composition according to claim 1, wherein FEC is comprised in an amount (y) of 9.8≤y≤14.0 wt. %.

3. The electrolyte composition according to claim 1, wherein FEC is comprised in an amount of 9.8 wt. %.

4. The electrolyte composition according to claim 1, wherein SL/LiTFSI is comprised in a molar ratio (z) of 2.5<z<3.5.

5. The electrolyte composition according to claim 1, wherein SL/LiTFSI is comprised in a molar ratio (z) of 2.5<z≤3.0.

6. A lithium secondary battery cell comprising the electrolyte composition according to claim 1.

7. A sulfolane (SL)-based electrolyte composition suitable for lithium secondary batteries, consisting of:

lithium bis(trifluoromethansolfonyl)imide (LiTFSI) in an amount (x) of 37.9 wt. %≤x≤48.9 wt. %, fluoroethylene carbonate (FEC) in an amount (y) of 1.0≤y≤14.0 wt. %, and sulfolane, wherein SL/LiTFSI is comprised in a molar ratio (z) of 2.0≤z≤3.5.

* * * * *